(12) United States Patent
Gougerchian

(10) Patent No.: US 9,722,501 B1
(45) Date of Patent: Aug. 1, 2017

(54) SYSTEM AND METHOD OF IMPLEMENTING A BRUSHLESS VARIABLE TRANSFORMER

(71) Applicant: Abbie Gougerchian, Commerce, CA (US)

(72) Inventor: Abbie Gougerchian, Commerce, CA (US)

( * ) Notice: Subject to any disclaimer, the term of this patent is extended or adjusted under 35 U.S.C. 154(b) by 106 days.

(21) Appl. No.: 14/295,708

(22) Filed: Jun. 4, 2014

Related U.S. Application Data

(60) Provisional application No. 61/831,068, filed on Jun. 4, 2013.

(51) Int. Cl.
*H02M 5/10* (2006.01)
*H02M 5/45* (2006.01)
*H02M 1/12* (2006.01)

(52) U.S. Cl.
CPC .............. *H02M 5/10* (2013.01); *H02M 1/12* (2013.01); *H02M 5/45* (2013.01)

(58) Field of Classification Search
CPC .................................................. H02M 5/10
USPC .................................. 323/258, 361
See application file for complete search history.

(56) References Cited

U.S. PATENT DOCUMENTS 3,973,165 A * 8/1976 Hester ................. H02M 3/3384
219/761
2010/0066343 A1* 3/2010 Watt ........................ H02M 5/10
323/361

\* cited by examiner

*Primary Examiner* — Jue Zhang
*Assistant Examiner* — Trinh Dang
(74) *Attorney, Agent, or Firm* — Paul B. Heynssens Attorney at Law PLC

(57) ABSTRACT

A brushless variable transformer. Variable autotransformers, use brushes, and as such, have moving parts requiring maintenance and periodic cleaning of the brushes. A variable transformer without brushes is advantageous in that it eliminates the cleaning and maintenance of brushes.

11 Claims, 8 Drawing Sheets

SYSTEM AND METHOD OF IMPLEMENTING A BRUSHLESS VARIABLE TRANSFORMER

CROSS-REFERENCE TO RELATED APPLICATION

This application claims the benefit of U.S. Provisional Patent Application No. 61/831,068 filed Jun. 4, 2013, the contents of which are hereby incorporated by reference.

TECHNICAL FIELD

This description relates generally to electronic transformers and more specifically to brushless variable transformers.

BACKGROUND

An electronic transformer is an AC electronic component that will change, or transform an AC input voltage to a different output voltage level. An important characteristic of typical transformers is that circuitry connected to the primary is electrically isolated from circuitry connected to the secondary winding. An output voltage higher than the input voltage will generate a lower output current, and a lower output voltage will generate a higher output current. After accounting for losses in the transformer the power into the transformer is substantially equal to the output power produced. A transformer may have a first, primary winding upon a core, with a second winding, or secondary, also disposed upon the same core. The primary core to which an input voltage is applied, through electromagnetic coupling induces a voltage across the secondary. Accordingly the output voltage of a transformer may be changed by adding or removing secondary turns Alternatively, discrete voltages may be selected by attaching wires (taps) at various taps. The taps if connected to a rotary switch provide discrete, but variable output voltages.

In an alternative construction a more continuous output voltage may be produced by allowing a conductor (typically a carbon brush), to slide over exposed turns of a secondary winding. Typically, a knob is provided, and turning it in one direction increases the voltage output, and the opposite direction decreases the output voltage.

Transformers of this sort may be desirable in applications which require a variable voltage, such as light dimmers, welders, motor controls, audio applications, testing equipment at low and high end operating conditions, and the like. However, using a conventional transformer with a bulky core and two windings in such applications would not be practical. If electrical isolation is not needed a device called an autotransformer may be substituted for a transformer. It advantageously utilizes a single winding in which taps or brushes may be applied as previously described in a transformer.

FIG. 1. shows a schematic of an autotransformer 100, which has a single winding 102 over a core material 104 with two primary terminals 106 and 108 at the extreme ends of that single, or primary winding. It also has one or more terminals or taps 110 at intermediate tap points along the single winding 102 that forms the secondary winding or circuit. Thus the primary and secondary coils have part or all of their turns in common.

The primary voltage 112 is applied across two of the primary terminals, and the secondary voltage 114 taken from the tap terminals. The autotransformer almost always has one terminal 108, in common with the primary voltage. The primary and secondary circuits, therefore, have a number of windings turns in common. Since the volts-per-turn is the same in both windings, each develops a voltage in proportion to its number of turns. In an autotransformer, part of the current flows directly from the input to the output, and only part of the current is transferred by induction.

Autotransformers may also include many taps and include additional automatic switchgear to allow them to act as automatic voltage regulators to maintain a steady voltage over a wide range of load conditions. If a sliding tap is used that contacts more than one turn at a time, the turns are shorted. However if a resistance is inserted sliding tap the shorting problem may be eliminated. An autotransformer that is designed to produce continuous voltage variation, without shorting adjacent turns is known as a variable autotransformer, such as the VARIAC® variable autotransformer from Instrument Service and Equipment, Inc., Cleveland, Ohio FIG. 2 shows an electrical schematic of a variable autotransformer. In a variable autotransformer, part of the winding coils 202 may be exposed and the secondary connection is made with a sliding brush 204. The brush is typically a carbon brush. The primary connection is 206. The addition of the brush, which may be controlled with an external knob (not shown) allows a continuously variable turns ratio to be obtained, which is established by the location in the winding the brush makes contact. This allows for very smooth control of voltage. The output voltage 208 is not limited to the discrete voltages represented by actual number of turns. The input voltage 210 can be smoothly varied between turns as the brush has a relatively high resistance (compared with a metal contact) and the actual output voltage is a function of the relative area of brush in contact with adjacent windings. The primary connection 206 can be connected to only a part of the winding allowing the output voltage to be varied smoothly from zero to above the input voltage. This allows a variable autotransformer to be used for testing electrical equipment at the limits of its specified voltage range.

Brushes make physical and electrical contact in conducting electricity between moving parts and tend to wear from use. Typical applications of brushes include electric motors, alternators, electric generators, and variable autotransformers. Accordingly it would be desirable to eliminate the use of brushes in a variable transformer design.

Those having skill in the art would understand the desirability of having a variable transformer that uses circuitry to vary and regulate output voltage without brushes. The variable transformer described herein allows the use of a variable transformer not requiring cleaning and maintenance of moving parts, nor mechanical brushes.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides a brushless variable transformer using electronic switches and a unique circuitry to provide a variable voltage output. A variable transformer without brushes is advantageous in that it eliminates the cleaning and maintenance of brushes.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples of a brushless variable transformer and is not intended to represent the only forms in which the present example may be constructed or utilized. The description sets forth the functions of the example and the sequence of steps for constructing and operating the example. However, the same or equivalent functions and sequences may be accomplished by different examples.

The examples below describe a brushless variable transformer. As those skilled in the art will appreciate, the present examples are suitable for application in a variety of different types of voltage control and regulation systems.

Figure 1:
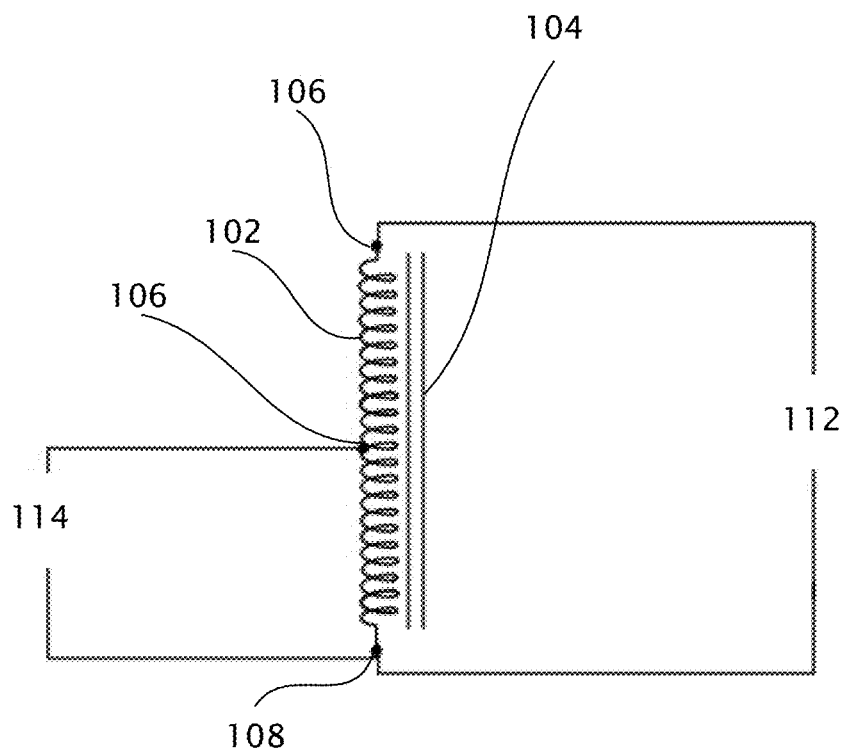
FIG. 1 shows an electrical schematic of an autotransformer.

FIG. 1 shows an electrical schematic of an autotransformer.

Figure 2:
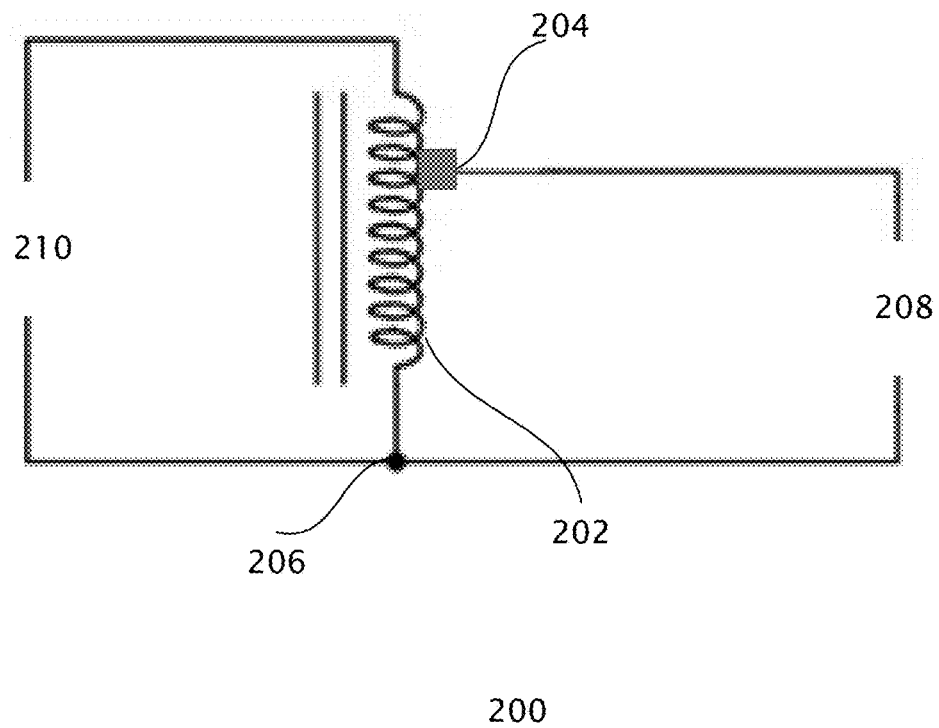
FIG. 2 shows an electrical schematic of a continuously variable autotransformer having brushes.

FIG. 2 shows an electrical schematic of a variable autotransformer.

Figure 3:
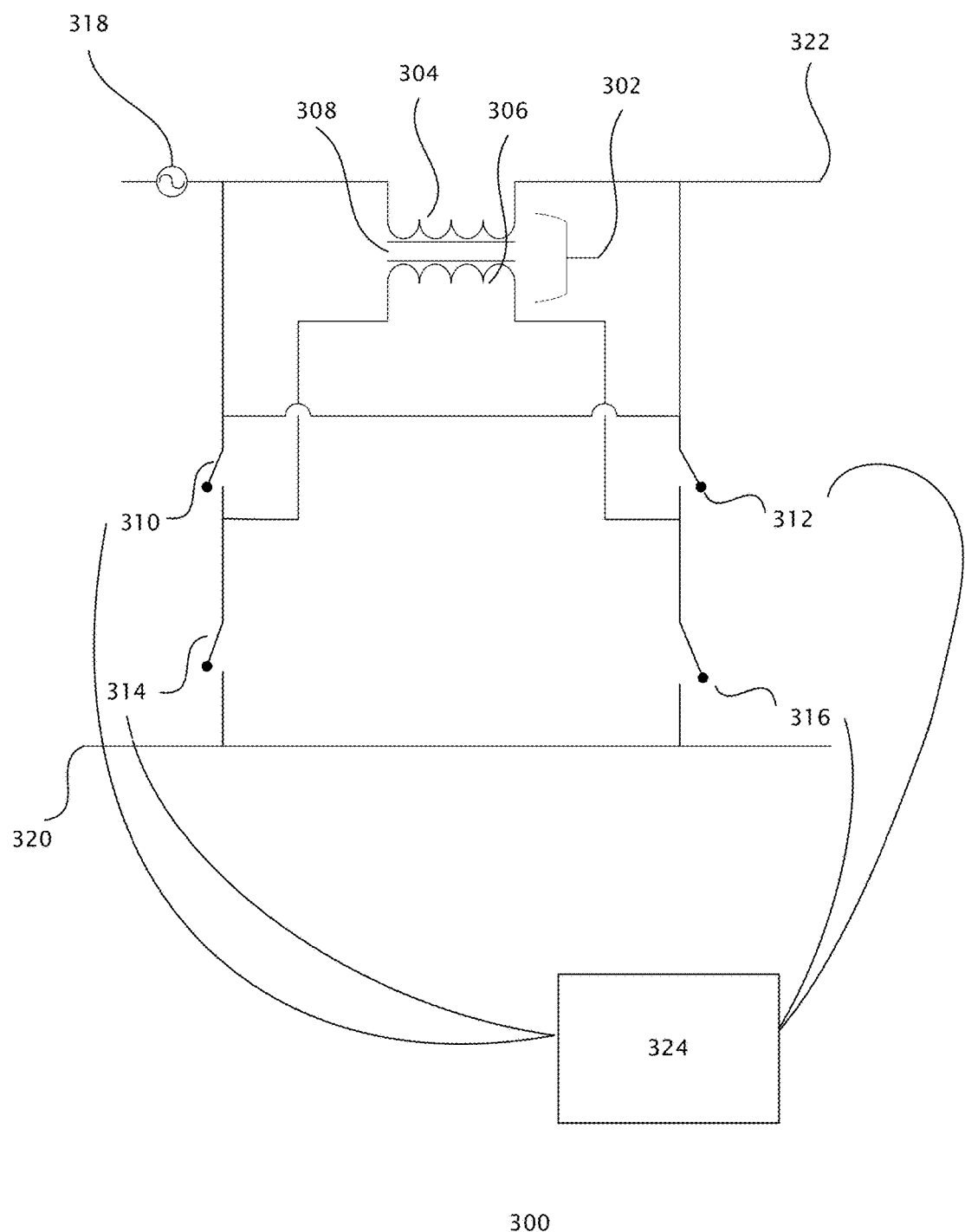
FIG. 3 shows an electrical schematic of a continuously variable autotransformer utilizing switches rather than brushes.

FIG. 3 shows an electrical schematic of a brushless variable transformer 300 constructed as described herein. A conventional transformer 302 has a primary winding 304 and a secondary winding 306 sharing a common core 308. Voltage is induced in the secondary winding 306 solely by inductive coupling to the primary winding 304. The transformer 302 is characterized by the ratio of the number of turns of the primary winding 304 around the common core 308 to the number of turns of the secondary winding 306 around the common core.

Power switches 310, 312, 314, and 316 are conventionally constructed switches, and may be of any suitable construction. These switches may be relays, contactors, or solid state power devices such as insulated gate bipolar transistors (IGBT) and silicon-controlled rectifiers (SCR), which are also known as thyristors. The switches are isolated from the line current, and operate at much lower voltage than line voltage. Alternating current (AC) at line voltage is provided at an input 318, and modified alternating current at variable voltage is at an output 322. The line voltage may be low, in the range of 200 to 400 VAC, or may be in a medium voltage range of 4600 to 13,600 VAC. The circuit is provided with a neutral connection 320.

Switches 310, 312, 314, and 316 are not operated at line voltage, and may be controlled using microcontrollers and/or a programmable logic controllers (PLC) 324 using proportional-integral-derivative control (PID) and or a microcontroller, or the like. The construction and wiring of such controllers is well known and is not shown in FIG. 3 for simplification of the diagram. The methods for implementing and controlling a brushless variable transformer as described herein are unique to the examples described below. Power switches 310, 312, 314, and 316 can be configured to allow or prevent current from passing through them, and subsequently alter the direction of current applied to the secondary winding of transformer 302, thereby making the output voltage buck or boost due to changes in the inductive voltage transfer from the secondary winding 306. The various switch configurations and subsequent variation in the output voltage are described in FIGS. 4, 5, and 6.

Figure 4:
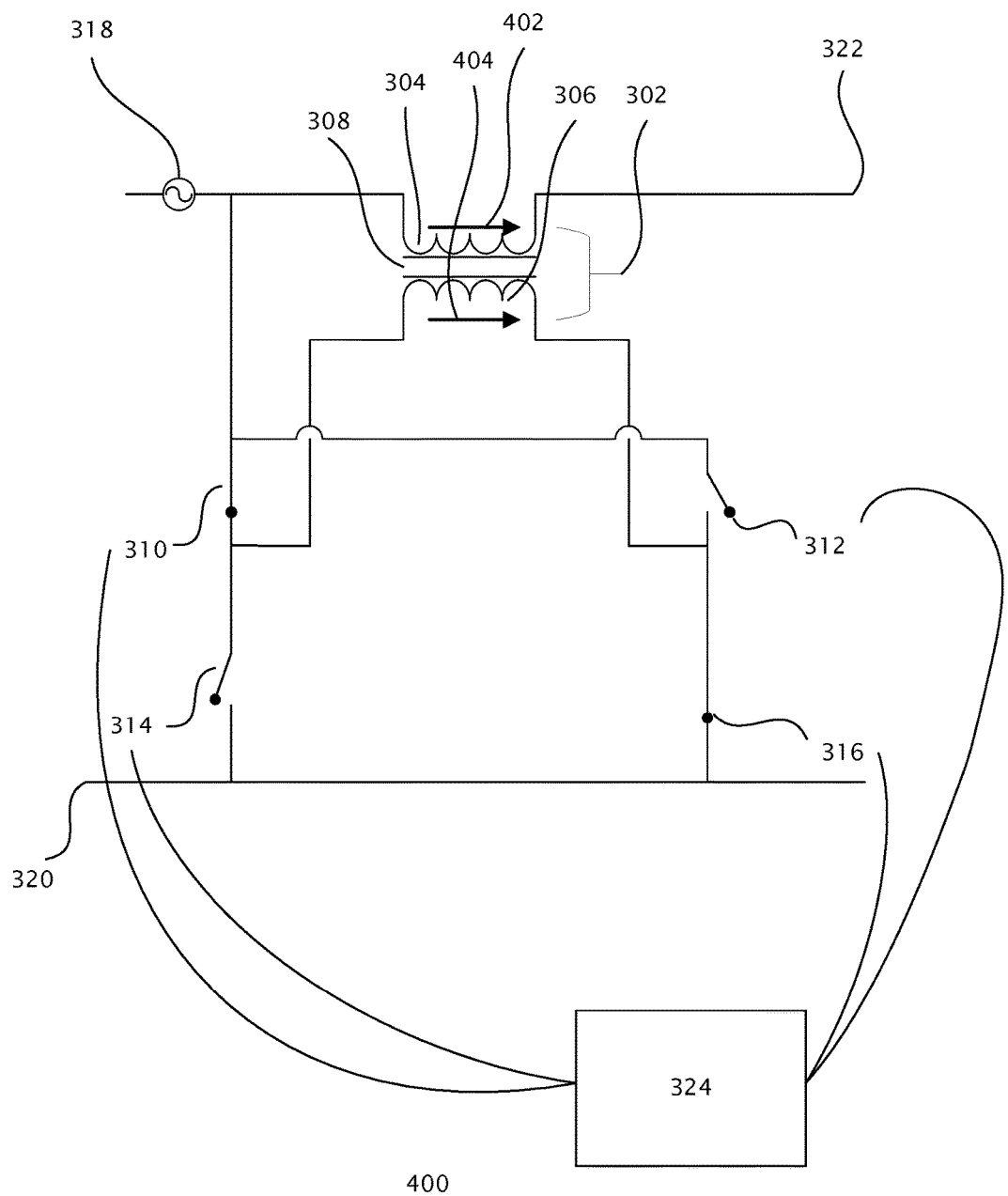
FIG. 4 shows an electrical schematic of the brushless variable transformer with switches set in a first position wherein the switches are closed to create an increase in line voltage.

FIG. 4 shows an electrical schematic of a brushless variable transformer wherein the switches are opened or closed to create an increase in line voltage. The controller 324 directs the switches 310 and 316 to allow current to flow through them, and switches 314 and 316 not allow current to pass. Input alternating current 318 passes through the primary winding of transformer 302. Arrow 502 shows the direction of current flow. Simultaneously, the condition of switches 312 and 316 allow current from input 318 to pass through the secondary winding 306 of transformer 302 to neutral 320. Arrow 504 shows the direction of current flow in the secondary winding. The condition of switch 316 connects the circuit to the neutral 320.

Inductive coupling of the primary and secondary windings in this example provides for an increase in the voltage at the circuit output 406. The magnitude of the output depends on the ratio of the number of wire turns in the primary winding 304 to the number of wire turns in the secondary winding 306 in transformer 302. If, for example, when the secondary winding of transformer 402 is wound to produce 1% of the output, the output voltage 406 will equal the input voltage of the input current 318 plus 1%.

Figure 5:
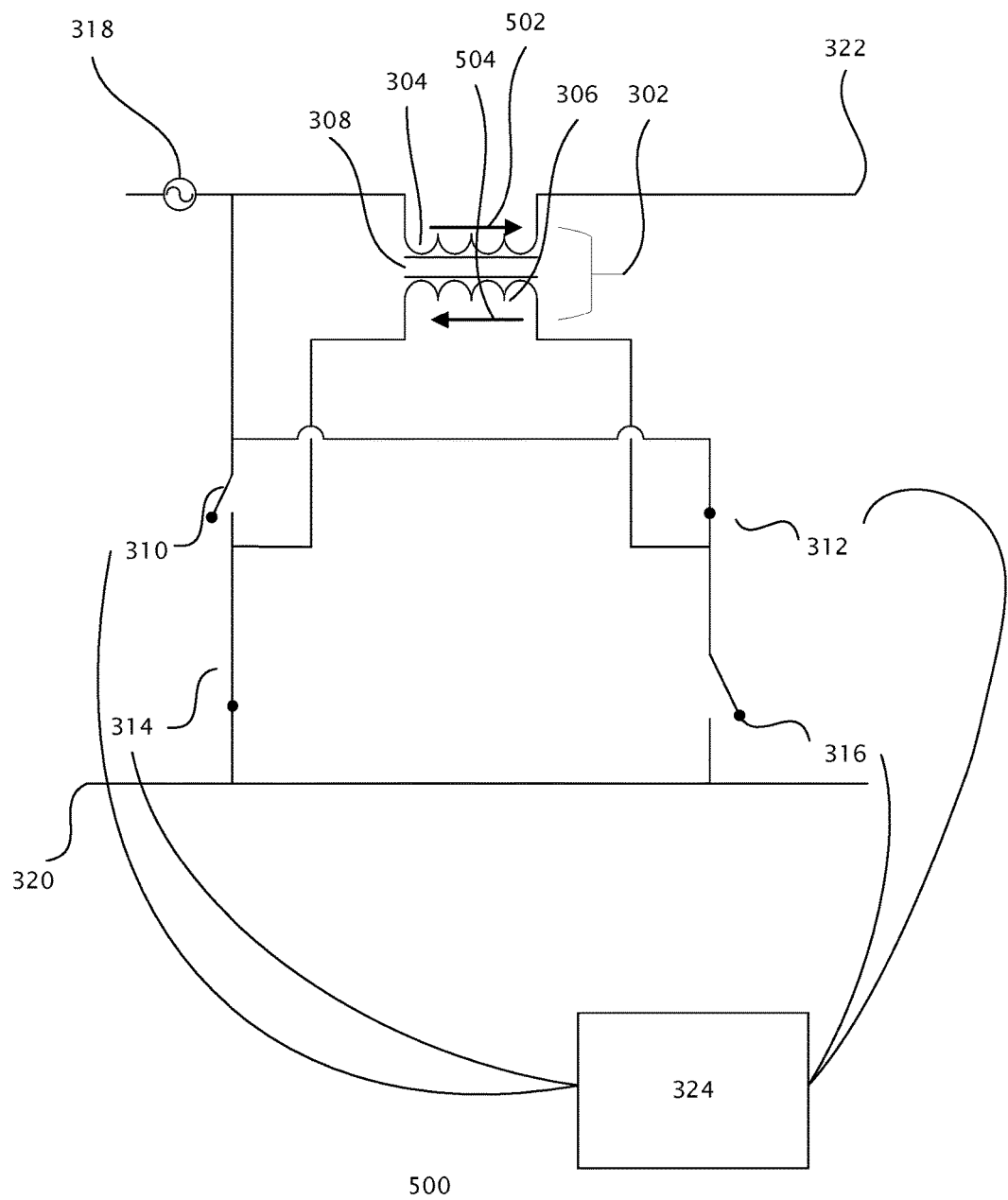
FIG. 5 shows an electrical schematic the brushless variable transformer with switches set in a second position wherein the switches are closed to create a decrease in line voltage.

FIG. 5 shows an electrical schematic of the present invention wherein the switches are configured to create a decrease in line voltage. Here, the controller 324 activates switches 312 and 314 to allow current to flow through them, and switches 310 and 316 not to allow current to pass. Input alternating current 318 passes through the primary winding of transformer 302. Arrow 502 shows the direction of current flow. Simultaneously, the condition of switches 312 and 314 allow current from input 318 to pass through the secondary winding 306 of transformer 302 to neutral 320. Arrow 504 shows the direction of current flow in the secondary winding. The condition of switch 314 connects the circuit to the neutral 320.

Inductive coupling of the primary and secondary windings in this example provides for a decrease in the voltage at the circuit output 506. The magnitude of the output depends on the ratio of the number of wire turns in the primary winding 304 to the number of wire turns in the secondary winding 306 in transformer 302. If, for example, when the secondary winding of transformer 302 is wound to produce 1% of the output, the output voltage 506 will equal the input voltage of the input current 318 minus 1%.

Figure 6:
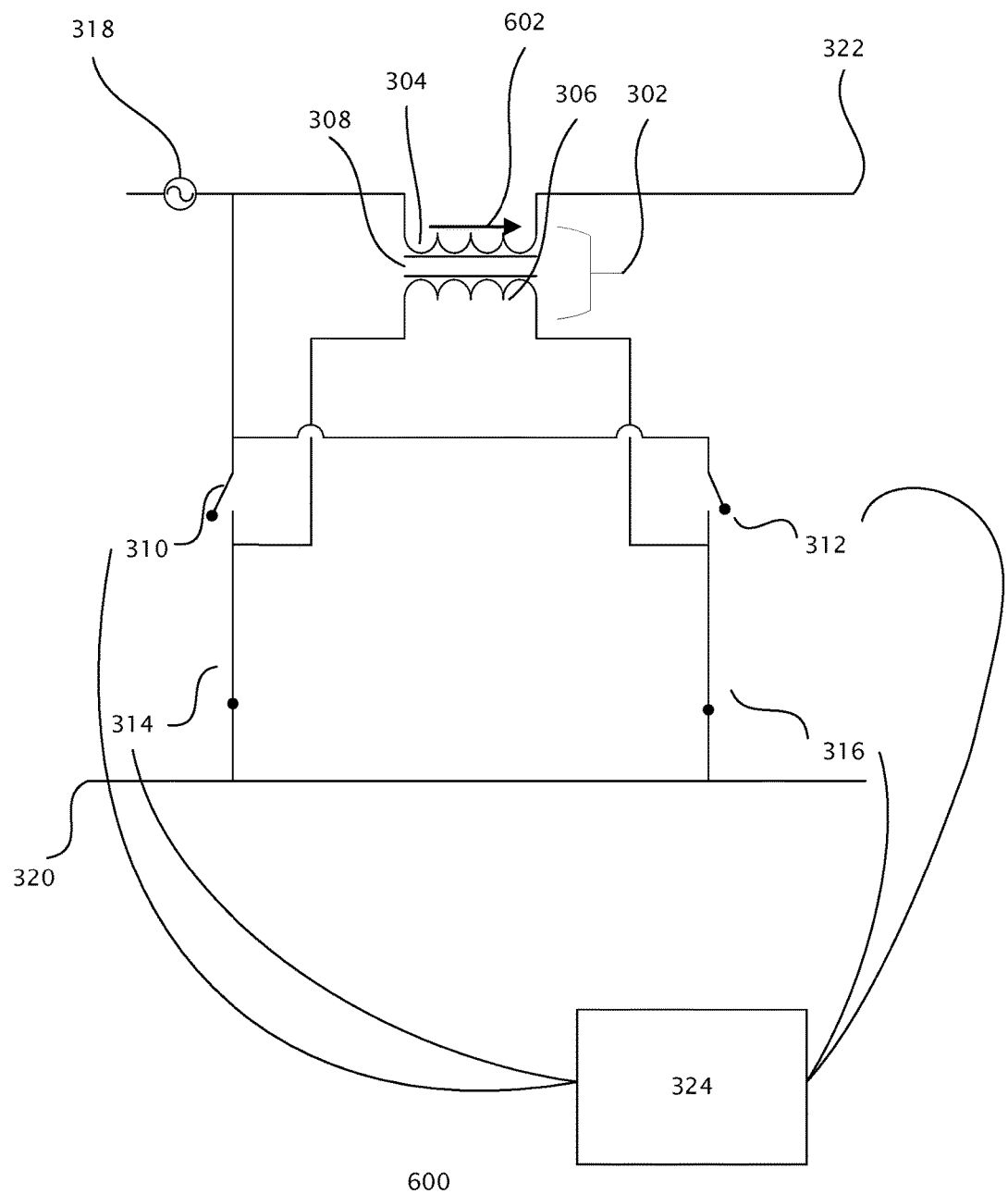
FIG. 6 shows an electrical schematic of the brushless variable transformer with switches set in a third position wherein the output voltage equals the input voltage.

FIG. 6 shows an electrical schematic of the present invention wherein the output voltage equals the input voltage. Here, switches 314 and 316 are activated by the controller 324 to allow current to flow through them, and switches 310 and 312 do not allow current to pass. Input alternating current 318 passes through the primary winding of transformer 302. Arrow 602 shows the direction of current flow. Simultaneously, the condition of switches 310 and 412 do not allow current from input 318 to pass through the secondary winding 306 of transformer 302. As such, there is no current to provide inductive coupling to the current passing through the primary winding 602 and its voltage remains unchanged from the voltage of the input current 318.

Figure 7:
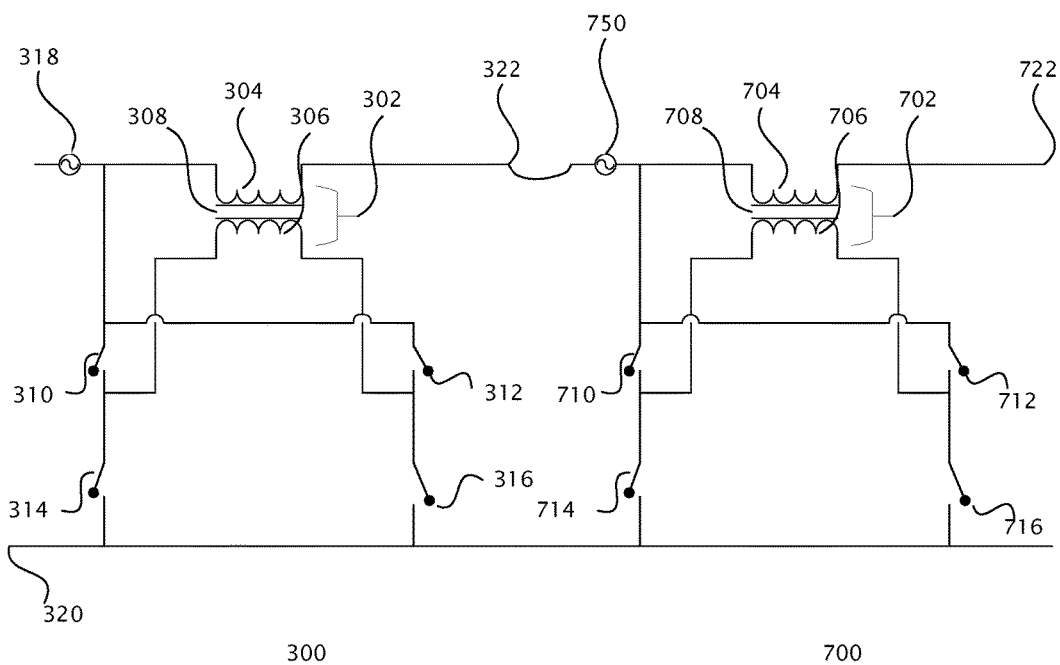
FIG. 7 shows an electrical schematic of multiples of present invention used in series.

FIG. 7 shows an electrical schematic of multiples of present invention used in series. For simplification of the diagram, the controller for the switches is not shown. Although an exemplary pair of circuits 300 and 700 providing brushless variable transformers are shown, it is obvious to those skilled in the art that a plurality of such circuits can be connected in series to provide a wide range of possible voltage outputs. Each brushless variable transformer circuit can be provided with a different ratio of the number of wire turns in the primary windings to the number of turns in the secondary windings providing a wide range of possible outputs.

When multiple circuits shown above are coupled, or cascaded in series, the amount of buck (decrease in voltage) or boost (increase in voltage) can be controlled to get desired voltage at the output. In FIG. 7, two circuits 300 and 700 are coupled in series with different primary winding to secondary winding turns ratio transformers 302 and 702. The output current 322 from circuit 300 is the input current 750 to circuit 700.

If, for example, transformer 302 provides an exemplary 1% variation in the output current 322 voltage, there are three possible conditions transformer 302 can effect on the output current. These are +1%, −1%, and 0%. The +1% condition occurs when the switched in the circuit 300 are as shown in FIG. 4, −1% occurs when the switches in circuit 300 are as shown in FIG. 5, and 0% when in the switches are as shown in FIG. 6.

Similarly for circuit 700, if the ratio of the primary winding 706 turns to the secondary winding 708 are such that the transformer 704 provides an exemplary 3% variation, the three conditions circuit 700 can effect on the input current is +3%, −3%, and 0%. By linking the circuit 300 and circuit 700 in series such that the output current 322 is also the input current 750 to circuit 700, the voltage variation range is +/−4%.

By simultaneously activating with a controller, the switches 310, 312, 314, 316 and 710, 712, 714, 716 on the brushless variable transformer circuits 300 and 700 can be positioned to allow or not allow current to pass. An example of the possible voltage variations possible for this example is shown in FIG. 8.

Figure 8:
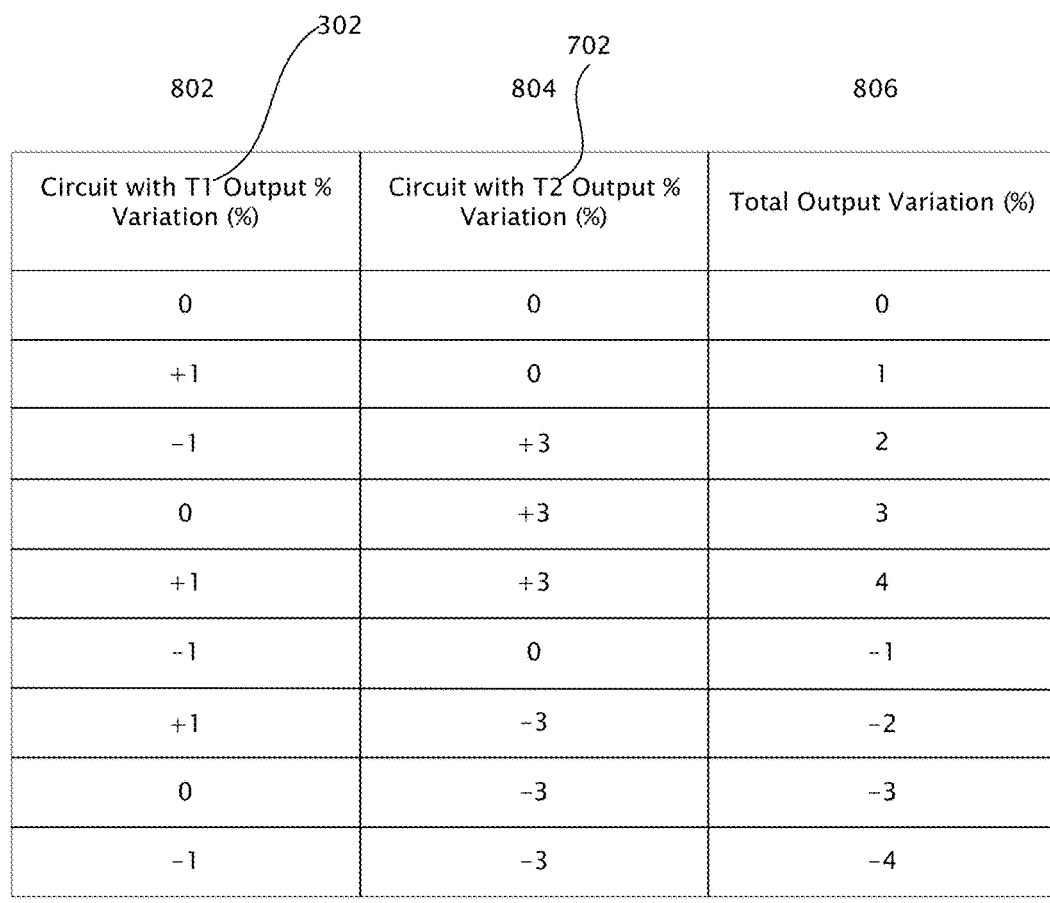
FIG. 8 shows a table with exemplary total voltage output variation for various switch configurations.

FIG. 8 shows a table with exemplary total voltage output variation for various switch configurations for the exemplary variable transformers shown in FIG. 7. With two circuits with transformer 302 providing +/−1% of variation and transformer 704 providing a variation of +/−3%, it is possible to vary the output voltage of the cascade from −4% to +4%. Column 802 of FIG. 8 shows the possible effects on the input current voltage provided by circuit 300 in FIG. 7. Column 804 shows the possible effects on its input current voltage provided by circuit 700 in FIG. 7. Column 806 shows the total variation in voltage provided by the two circuit operating in series as shown in FIG. 7.

For the positive values in each of column 802 and 804, the switches are configured as shown in FIG. 4; for negative values, the switches are configured as shown in FIG. 5, and zero values occur when the switches are as shown in FIG. 6. By varying the switch positions systematically using the controller, total output variation in column 806 can be varied from +4 to −4%.

The examples provided above are but exemplary, and not limiting. The basic circuit may be varied in construction as long as a buck and boost may be applied to the output, causing a controlled variation without use of brushes. Alternatively the cascaded configurations and their ratios of primary winding turns to secondary winding turns may be adjusted to produce a variety of outputs.

For example, it is possible to couple more stages and get output variation of −31% to +31%, or −46% to +46%. If additional precision is required, additional stages of ½% or ¼% could be added. Similar stages may be constructed for use in three phase input/output needs Those skilled in the art will realize that the process sequences described above may be equivalently performed in any order to achieve a desired result. Also, sub-processes may typically be omitted as desired without taking away from the overall functionality of the processes described above.

The invention claimed is:
1. A circuit comprising:
 a transformer including:
  a core;
  a primary winding wound about the core having a first primary terminal and a second primary terminal in which the first primary terminal is coupled to an AC source, and the second primary terminal forms a variable voltage output; and
  a secondary winding wound about the core having a first secondary terminal and a second secondary terminal;
 a first switch having a first first switch terminal and a second first switch terminal;
 a second switch having a first second switch terminal and a second second switch terminal;
 a third switch having a first third switch terminal and a second third switch terminal; and
 a fourth switch having a first fourth switch terminal and a second fourth switch terminal;
 where the first primary winding terminal is coupled to the first terminal of the first switch and the first terminal of the third switch, where the second terminal of the first switch is coupled to the first terminal of the secondary winding and the first terminal of the second switch, where the second terminal of the second switch is coupled to an AC neutral line, where the second terminal of the third switch is coupled to the second terminal of the secondary winding and the first terminal of the fourth switch, and where the second terminal of the fourth switch is coupled to the AC neutral line.

2. The circuit of claim 1 in which the alternating current input is in the range of 200 VAC to 600 VAC.

3. The circuit of claim 1 in which the alternating current input is in the range of 4,600 VAC to 13,600 VAC.

4. The circuit of claim 1 in which the switches are controlled with a microcontroller.

5. The circuit of claim 1 in which the switches are controlled using programmable logic control.

6. A circuit comprising:
- a transformer including:
  - a core;
  - a primary winding wound about the core having a first primary terminal and a second primary terminal in which the first primary terminal is coupled to an AC source, and the second primary terminal forms a variable voltage output; and
  - a secondary winding wound about the core having a first secondary terminal and a second secondary terminal;
- a first switch having a first first switch terminal and a second first switch terminal;
- a second switch having a first second switch terminal and a second second switch terminal;
- a third switch having a first third switch terminal and a second third switch terminal; and
- a fourth switch having a first fourth switch terminal and a second fourth switch terminal;

where the first primary winding terminal is connected to the first terminal of the first switch and the first terminal of the third switch, where the second terminal of the first switch is connected to the first terminal of the secondary winding and the first terminal of the second switch, where the second terminal of the second switch is connected to an AC neutral line, where the second terminal of the third switch is connected to the second terminal of the secondary winding and the first terminal of the fourth switch, and where the second terminal of the fourth switch is connected to the AC neutral line.

7. The circuit of claim 6 in which the alternating current input is in the range of 200 VAC to 600 VAC.

8. The circuit of claim 6 in which the alternating current input is in the range of 4,600 VAC to 13,600 VAC.

9. The circuit of claim 6 in which the switches are controlled with a microcontroller.

10. The circuit of claim 6 in which the switches are controlled using programmable logic control.

11. The circuit of claim 6 in which the switches are isolated from the line current.

* * * * *